United States Patent
Choudhury et al.

(10) Patent No.: US 11,651,042 B2
(45) Date of Patent: May 16, 2023

(54) INFORMATION PROCESSING METHOD AND DEVICE

(71) Applicant: Samsung Electronics Co., Ltd., Suwon-si (KR)

(72) Inventors: Mainak Choudhury, Bangalore (IN); Abhishek Sharma, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/734,928

(22) PCT Filed: Jun. 3, 2019

(86) PCT No.: PCT/KR2019/006655
§ 371 (c)(1),
(2) Date: Dec. 3, 2020

(87) PCT Pub. No.: WO2019/235791
PCT Pub. Date: Dec. 12, 2019

(65) Prior Publication Data
US 2021/0256078 A1 Aug. 19, 2021

(30) Foreign Application Priority Data

Jun. 5, 2018 (IN) .............................. 201841020997
Jan. 7, 2019 (IN) .............................. 201841020997
May 28, 2019 (KR) ........................ 10-2019-0062592

(51) Int. Cl.
*G06F 16/9532* (2019.01)
*G06F 16/9535* (2019.01)
(Continued)

(52) U.S. Cl.
CPC ...... *G06F 16/9532* (2019.01); *G06F 3/04842* (2013.01); *G06F 16/9535* (2019.01);
(Continued)

(58) Field of Classification Search
CPC ............. G06F 16/9532; G06F 16/9535; G06F 16/9538
(Continued)

(56) References Cited

U.S. PATENT DOCUMENTS 8,028,096 B2  9/2011  Brune et al.
8,816,828 B2  8/2014  Ebrom et al.
(Continued)

FOREIGN PATENT DOCUMENTS

KR     10-0525414 B1    11/2005
KR   10-2006-0037488 A   5/2006
(Continued)

OTHER PUBLICATIONS

International Search Report dated Sep. 6, 2019 in connection with International Patent Application No. PCT/KR2019/006655, 2 pages.
(Continued)

*Primary Examiner* — Mark E Hershley

(57) ABSTRACT

Provided is a method, performed by an information processing device, of processing information by using an Internet of things (IoT) device, the method including: receiving, from a user, a web search query; fetching context information of at least one IoT device related to the web search query; automatically generating a synthetic web search query including the web search query and the context information of the at least one IoT device; and determining a control to be applied to the at least one IoT device by using a search result regarding the synthetic web search query.

18 Claims, 12 Drawing Sheets

(51) Int. Cl.
*G06F 16/9538* (2019.01)
*G06F 3/04842* (2022.01)
*G16Y 40/35* (2020.01)
*G16Y 10/75* (2020.01)

(52) U.S. Cl.
CPC .......... *G06F 16/9538* (2019.01); *G16Y 10/75* (2020.01); *G16Y 40/35* (2020.01)

(58) Field of Classification Search
USPC ........................................................ 707/722
See application file for complete search history.

(56) References Cited

U.S. PATENT DOCUMENTS

| | | | |
|---|---|---|---|
| 9,716,675 B2 | 7/2017 | Choi et al. | |
| 9,906,605 B2 | 2/2018 | Nguyen et al. | |
| 10,185,934 B2* | 1/2019 | Gupta | G06Q 30/0269 |
| 10,802,780 B2 | 10/2020 | Park et al. | |
| 2013/0110806 A1* | 5/2013 | Cai | G06F 16/901 |
| | | | 707/706 |
| 2015/0019342 A1* | 1/2015 | Gupta | G06Q 30/0269 |
| | | | 705/14.66 |
| 2015/0341446 A1* | 11/2015 | Nguyen | H04L 67/12 |
| | | | 709/223 |
| 2015/0359039 A1* | 12/2015 | Haque | G06F 16/95 |
| | | | 702/188 |
| 2016/0105292 A1 | 4/2016 | Choi et al. | |
| 2016/0179962 A1* | 6/2016 | Patten | G06F 16/9535 |
| | | | 707/706 |
| 2016/0205106 A1* | 7/2016 | Yacoub | H04W 12/041 |
| | | | 726/28 |
| 2016/0275190 A1 | 9/2016 | Seed et al. | |
| 2016/0294614 A1* | 10/2016 | Searle | H04L 67/34 |
| 2017/0220612 A1* | 8/2017 | Crossley | G06F 16/24554 |
| 2017/0315766 A1 | 11/2017 | Park et al. | |
| 2017/0318421 A1* | 11/2017 | Kim | H04W 4/021 |
| 2018/0101574 A1* | 4/2018 | Tang | G06F 16/2455 |
| 2018/0188896 A1* | 7/2018 | Ghafourifar | G06F 40/30 |
| 2018/0189017 A1* | 7/2018 | Ghafourifar | G09G 5/003 |
| 2018/0239873 A1* | 8/2018 | Eda | G16H 70/60 |
| 2019/0333523 A1* | 10/2019 | Kim | G06F 21/602 |
| 2019/0370401 A1* | 12/2019 | Grant | H04W 4/70 |
| 2019/0388783 A1* | 12/2019 | Gódor | G06F 3/011 |

FOREIGN PATENT DOCUMENTS

| | | |
|---|---|---|
| KR | 10-2007-0009266 A | 1/2007 |
| KR | 10-2016-0044068 A | 4/2016 |
| KR | 10-2017-0066316 A | 6/2017 |
| KR | 10-2017-0093726 A | 8/2017 |
| KR | 10-2017-0101692 A | 9/2017 |
| KR | 10-2017-0109399 A | 9/2017 |
| KR | 10-2018-0029232 A | 3/2018 |
| WO | 2009/085586 A1 | 7/2009 |

OTHER PUBLICATIONS

Office Action dated Sep. 7, 2020 in connection with Korean Patent Application No. 10-2019-0062592, 7 pages.
Samsung India, "Cleaning the Washing Machine", Oct. 12, 2020, 5 pages.
Office Action dated Mar. 24, 2021 in connection with Korean Patent Application No. 10-2019-0062592, 9 pages.

* cited by examiner

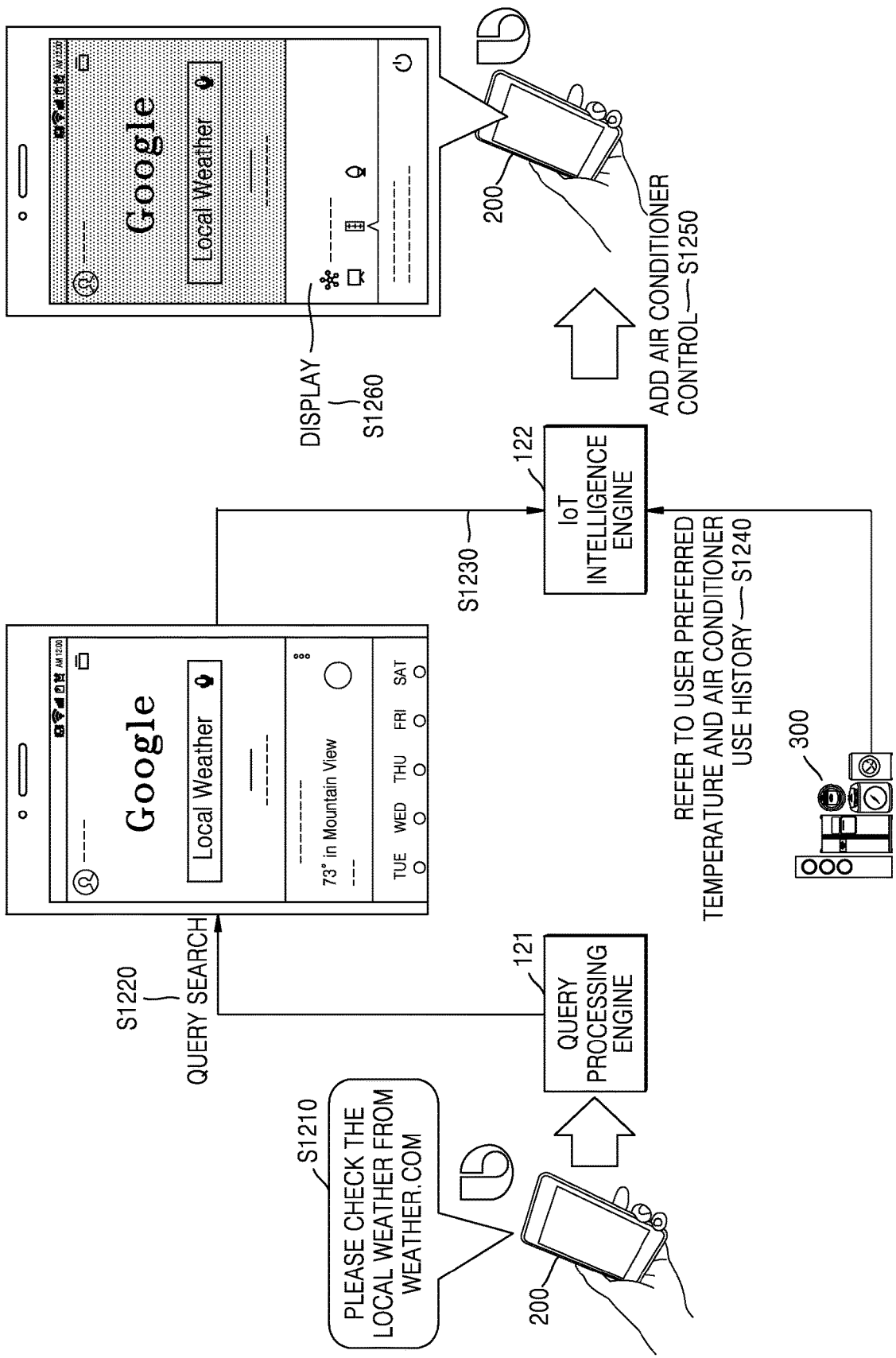

INFORMATION PROCESSING METHOD AND DEVICE

CROSS-REFERENCE TO RELATED APPLICATIONS

This application is a 371 of International Application No. PCT/KR2019/006655 filed on Jun. 3, 2019, which claims priority to India Patent Application No. 201841020997 filed on Jun. 5, 2018, India Patent Application No. 201841020997 filed on Jan. 7, 2019, and Korean Patent Application No. 10-2019-0062592 filed on May 28, 2019, the disclosures of which are herein incorporated by reference in their entirety.

BACKGROUND

1. Field

Embodiments of the present disclosure relate to information processing methods and devices, and more particularly, to a method of generating a synthetic web search query by adding Internet of things (IoT) device-related context information to a query received from a user and determining a control over an IoT device, based on a web search result regarding the synthetic web search query, and a device for performing the method.

2. Description of Related Art

With the development of the Internet, there has been an increase in searching for information through the Internet and using found information.

However, it takes considerable effort to understand the found information and apply the found information in real life.

To facilitate application of a web search result, there is a need for research into a technology for searching for information by using Internet of things (IoT) device information around a user and applying a result of the searching to an IoT device.

SUMMARY

According to an aspect of the present disclosure, a method, performed by an information processing device, of processing information by using an Internet of things (IoT) device, includes: receiving, from a user, a web search query; fetching context information of at least one IoT device related to the web search query; automatically generating a synthetic web search query including the web search query and the context information of the at least one IoT device; and determining a control to be applied to the at least one IoT device by using a search result regarding the synthetic web search query.

According to another aspect of the present disclosure, an information processing device includes: a memory; and at least one processor configured to receive a web search query from a user, fetch context information of at least one Internet of things (IoT) device related to the web search query, automatically generate a synthetic web search query including the web search query and the context information of the at least one IoT device, and determine a control to be applied to the at least one IoT device by using a search result regarding the synthetic web search query.

According to another aspect of the present disclosure, a computer-readable recording medium has recorded thereon a program for executing the information processing method on a computer.

According to another aspect of the present disclosure, an information processing device includes: a memory; and at least one processor configured to receive a web search query from a user through an electronic device, fetch context information of at least one Internet of things (IoT) device connected to the electronic device and related to the web search query through the electronic device, automatically generate a synthetic web search query including the web search query and the context information of the at least one IoT device, and controlling the at least one IoT device by using a search result regarding the synthetic web search query.

A web search result can be easily applied by searching for information by using Internet of things (IoT) device information around a user and applying a result of the searching to an IoT device.

BRIEF DESCRIPTION OF THE DRAWINGS

FIG. 12 illustrates a method of providing a web search and suggestion based on an IoT context, according to an embodiment of the present disclosure.

DETAILED DESCRIPTION

Figure 1:
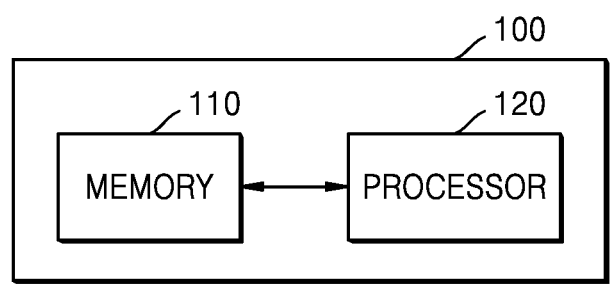
FIG. 1 is a structural diagram of an information processing device according to an embodiment of the present disclosure.

According to an aspect of the present disclosure, a method, performed by an information processing device, of processing information by using an Internet of things (IoT) device, includes: receiving, from a user, a web search query; fetching context information of at least one IoT device related to the web search query; automatically generating a synthetic web search query including the web search query and the context information of the at least one IoT device;

and determining a control to be applied to the at least one IoT device by using a search result regarding the synthetic web search query.

The context information of at least one IoT device may include at least one of a type of the at least one IoT device, a model name of the at least one IoT device, a basic setting, a location of the at least one IoT device, and state information measured by at least one sensor included in the at least one IoT device.

The automatic generating of the synthetic web search query may include: extracting a first keyword from the web search query; generating a second keyword related to the at least one IoT device from the context information of the at least one IoT device; and combining the first keyword and the second keyword.

The determining of the control to be applied to the at least one IoT device may include: identifying one or more instructions related to the at least one IoT device from the search result; determining a control over the at least one IoT device performing the identified one or more instructions; and optimizing the control over the at least one IoT device.

The information processing method may further include displaying, to the user, the control to be applied to the at least one IoT device.

The information processing method may further include applying the search result regarding the synthetic web search query to the at least one IoT device in response to the control to be applied to the at least one IoT device being displayed in a button and a user input regarding the button being received.

The information processing method may further include automatically performing the determined control on the at least one IoT device.

The information processing method may further include: predicting a need of the user related to the search result; and determining the control to be applied to the at least one IoT device to satisfy the predicted need of the user.

The determining of the control to be applied to the at least one IoT device may include: obtaining information about a preference of the user; and determining the control to be applied to the at least one IoT device by using the obtained information about the preference of the user.

According to another aspect of the present disclosure, an information processing device includes: a memory; and at least one processor configured to receive a web search query from a user, fetch context information of at least one Internet of things (IoT) device related to the web search query, automatically generate a synthetic web search query including the web search query and the context information of the at least one IoT device, and determine a control to be applied to the at least one IoT device by using a search result regarding the synthetic web search query.

The context information of at least one IoT device may include at least one of a type of the at least one IoT device, a model name of the at least one IoT device, a basic setting, a location of the at least one IoT device, and state information measured by at least one sensor included in the at least one IoT device.

The at least one processor may be further configured to execute the one or more instructions to extract a first keyword from the web search query, generate a second keyword related to the at least one IoT device from the context information of the at least one IoT device, and automatically generate the synthetic web search query by combining the first keyword and the second keyword.

The at least one processor may be further configured to execute the one or more instructions to identify one or more instructions related to the at least one IoT device from the search result, determine a control over the at least one IoT device performing the identified one or more instructions, and determine the control to be applied to the at least one IoT device by optimizing the control over the at least one IoT device.

The information processing device may further include a display displaying, to the user, the control to be applied to the at least one IoT device.

The at least one processor may be further configured to execute the one or more instructions to apply the search result regarding the synthetic web search query to the at least one IoT device in response to the control to be applied to the at least one IoT device being displayed in a button and a user input regarding the button being received.

The at least one processor may be further configured to execute the one or more instructions to automatically perform the determined control on the at least one IoT device.

The at least one processor may be further configured to execute the one or more instructions to predict a need of the user related to the search result and determine the control to be applied to the at least one IoT device to satisfy the predicted need of the user.

The at least one processor may be further configured to execute the one or more instructions to obtain information about a preference of the user and determine the control to be applied to the at least one IoT device by using the obtained information about the preference of the user.

According to another aspect of the present disclosure, a computer-readable recording medium has recorded thereon a program for executing the information processing method on a computer.

According to another aspect of the present disclosure, an information processing device includes: a memory; and at least one processor configured to receive a web search query from a user through an electronic device, fetch context information of at least one Internet of things (IoT) device connected to the electronic device and related to the web search query through the electronic device, automatically generate a synthetic web search query including the web search query and the context information of the at least one IoT device, and controlling the at least one IoT device by using a search result regarding the synthetic web search query.

Advantages and features of the present disclosure and methods of accomplishing the same may be understood more readily by reference to embodiments described below together with accompanying drawings. In this regard, the embodiments of the present disclosure may have different forms and should not be construed as being limited to the descriptions set forth herein. Rather, these embodiments will convey the concept of the present disclosure to one of ordinary skill in the art, and the present disclosure will only be defined by the appended claims.

The terms used in the specification will be briefly defined, and embodiments of the present disclosure will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the present disclosure. Thus, the terms used herein have to be defined based on the meaning of the terms together with the description throughout the specification.

When a part "includes" or "comprises" an element, unless there is a particular description contrary thereto, the part may further include other elements, not excluding the other elements.

Hereinafter, embodiments of the present disclosure will be described in detail with reference to the accompanying drawings such that one of ordinary skill in the art may easily implement the embodiments of the present disclosure. In the drawings, parts irrelevant to the description are omitted to clearly describe the present disclosure.

FIG. 1 is a structural diagram of an information processing device according to an embodiment of the present disclosure.

An information processing device 100 according to an embodiment of the present disclosure may include a memory 110 and a processor 120.

In the present disclosure, the information processing device 100 may be a tablet personal computer (PC), a laptop computer, a media player, a micro-server, a global positioning system (GPS) device, an electronic book terminal, a digital broadcast terminal, a navigation device, a kiosk, an MP3 player, a digital camera, an electronic device, or another mobile or non-mobile computing device, but is not limited thereto. Also, the information processing device 100 may be a wearable device, such as a watch, glasses, a hair band, or a ring, having a communication function and a data processing function.

The processor 120 controls whole operations of the information processing device 100.

The processor 120 may be configured to process at least one instruction by performing basic arithmetic, logic, and input/output operations. The instruction may be provided from the memory 110 to the processor 120. In other words, the processor 120 may be configured to execute the instruction according to a program code stored in a recording device such as the memory 110. Alternatively, the instruction may be received by the information processing device 100 through a communication interface (not shown) and provided to the processor 120.

Upon receiving a web search query from a user, the processor 120 may fetch context information of an Internet of things (IoT) device connected to the information processing device 100 and related to the received web search query.

In the present disclosure, the context information of the IoT device may include at least one of a type of the IoT device, a model name of the IoT device, a basic setting, a location of the IoT device, and state information measured by at least one sensor included in the IoT device. However, the context information of the IoT device is not limited thereto and any information about the IoT device may correspond to the context information of the IoT device.

Also, the processor 120 may automatically generate a synthetic web search query including the web search query received from the user and the context information of the IoT device. In other words, the synthetic web search query may denote a web search query generated by adding, to the web search query received from the user, the context information of the IoT device related to the web search query received from the user and communicably connected to the information processing device 100.

Also, the processor 120 may use the synthetic web search query to execute a web search and determine a control for executing the IoT device by using a search result.

According to an embodiment, the information processing device 100 may further include a display for displaying, to the user, the determined control. In this case, the information processing device 100 may receive, from the user, an input regarding whether to execute the determined control.

According to an embodiment, the information processing device 100 may not provide only the search result, but may display the control over the IoT device to which the search result is applicable in a simple button. The user may apply the search result to the peripheral IoT device without having to understand complicated processes, via the input regarding the button.

According to an embodiment, the processor 120 may apply the determined control to the IoT device.

The memory 110 may store a program instruction causing execution of the processor 120.

According to some embodiments, the information processing device 100 may include a plurality of memories.

According to the current embodiment, the memory 110 and the processor 120 are represented in separate component units, but according to some embodiments, the memory 110 and the processor 120 may be combined into one component unit.

Also, in the current embodiment, the memory 110 and the processor 120 are represented as component units adjacently located in the information processing device 100, but because devices performing functions of the memory 110 and processor 120 do not necessarily need to be physically adjacent to each other, the memory 110 and the processor 120 may be distributed according to an embodiment.

Also, the information processing device 100 is not limited to a physical device, and some of functions of the information processing device 100 may be implemented in software instead of hardware.

According to some embodiments, the information processing device 100 may further include an input device, a communication interface, or the like.

Each of elements described in the present specification may include one or more components, and names of the elements may vary depending on a type of a device. According to various embodiments, the device may include at least one element described in the specification, and some elements may be omitted or an additional element may be further included. Also, some of the elements of the device according to various embodiments may be combined to configure one entity to perform same functions as the elements before being combined.

Figure 2:
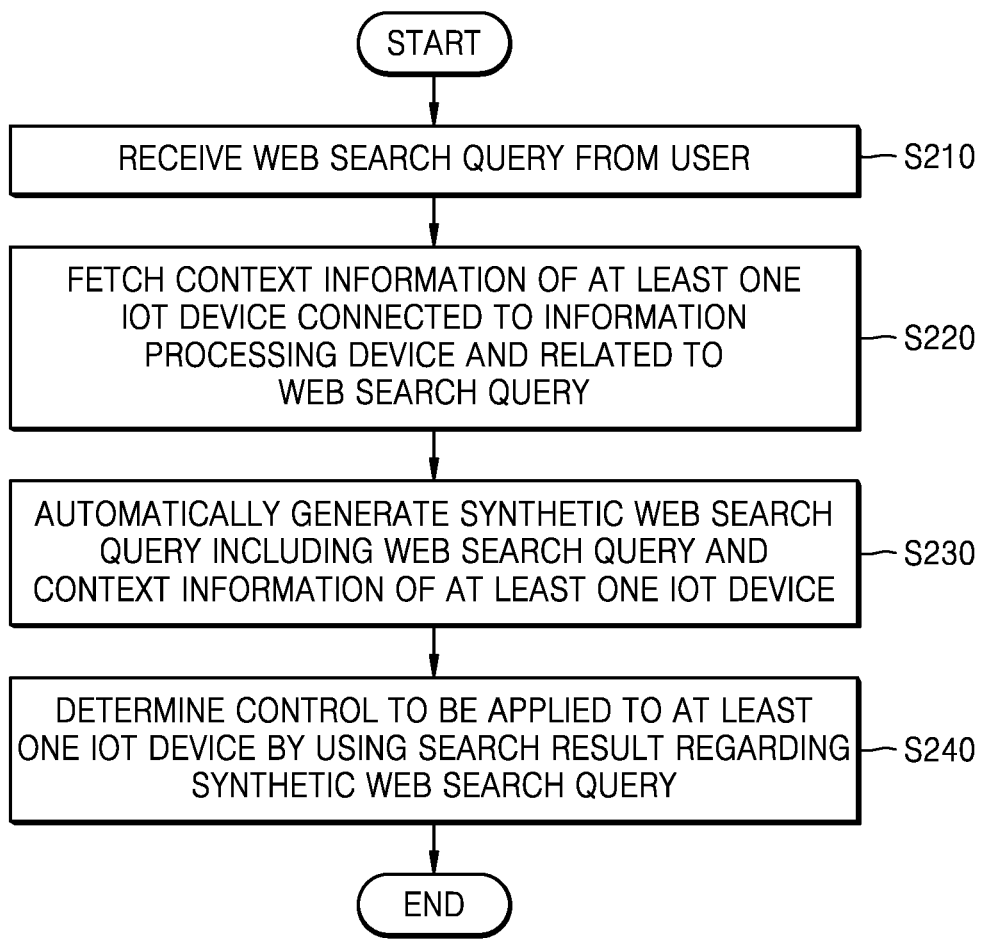
FIG. 2 is a flowchart of an information processing method according to an embodiment of the present disclosure.

FIG. 2 is a flowchart of an information processing method according to an embodiment of the present disclosure.

In operation S210, the information processing device 100 may receive a web search query from a user.

A method by which the information processing device 100 receives the web search query from the user may be various. For example, the information processing device 100 may receive a query from the user in a voice form, receive a query in a text form via a program such as an application or browser, or receive a query in a gesture or image form.

In operation S220, the information processing device 100 may fetch context information of at least one IoT device related to the web search query. The information processing device 100 and the at least one IoT device may be connected to each other.

According to an embodiment, the information processing device 100 and the at least one IoT device may be connected via a short-range wireless communication network. The short-range wireless communication network may include Bluetooth communication, Bluetooth low energy (BLE)

communication, near field communication, wireless local area network (WLAN) (Wi-Fi) communication, Zigbee communication, infrared data association (IrDA) communication, Wi-Fi direct (WFD) communication, ultra-wideband (UWB) communication, or Ant+ communication, but is not limited thereto.

According to an embodiment, the information processing device 100 may determine the at least one IoT device related to the web search query from among IoT devices located within a certain distance from the information processing device 100, and receive the context information of the determined at least one IoT device.

In operation S230, the information processing device 100 may automatically generate a synthetic web search query including the web search query and the context information of the at least one IoT device.

The information processing device 100 may automatically generate the synthetic web search query by combining the web search query and the context information of the at least one IoT device.

A method of generating the synthetic web search query will be described in detail below.

In operation S240, the information processing device 100 may determine a control to be applied to the at least one IoT device by using a search result regarding the synthetic web search query.

According to an embodiment, the information processing device 100 may determine the control to be applied to the at least one IoT device by using the search result regarding the synthetic web search query and display the determined control to the user. The information processing device 100 may receive, from the user, an input regarding whether to execute the determined control.

According to an embodiment, the information processing device 100 may automatically control the at least one IoT device by using the search result regarding the synthetic web search query.

According to an embodiment, operation S210 where the web search query is received from the user may be performed by an electronic device separate from the information processing device 100. In this case, the information processing device 100 may receive the web search query from the user via the electronic device. Also, the information processing device 100 may receive context information from at least one IoT device related to the web search query received from the user, from among IoT devices connected to the electronic device. The electronic device may be a tablet PC, a laptop computer, a media player, a micro-server, a GPS device, an electronic book terminal, a digital broadcast terminal, a navigation device, a kiosk, an MP3 player, a digital camera, an electronic device, or another mobile or non-mobile computing device, but is not limited thereto. Also, the electronic device may be a wearable device, such as a watch, glasses, a hair band, or a ring, having a communication function and a data processing function.

The method of the current embodiment may improve convenience of applying a web search result because an effort of a human is not required to understand a web search result and intelligence of a human is not required to follow instructions of the web search result and execute an IoT action according to a method suggested by the web search result.

Through the method of the current embodiment, the user may receive different search results depending on an IoT device owned by the user.

According to an embodiment, instead of searching for help related to the execution of the IoT device to apply the web search result to the IoT device, the user may execute the IoT device automatically or semi-automatically through a simple input on an IoT device execution menu automatically displayed to the user according to the search result.

Figure 3:
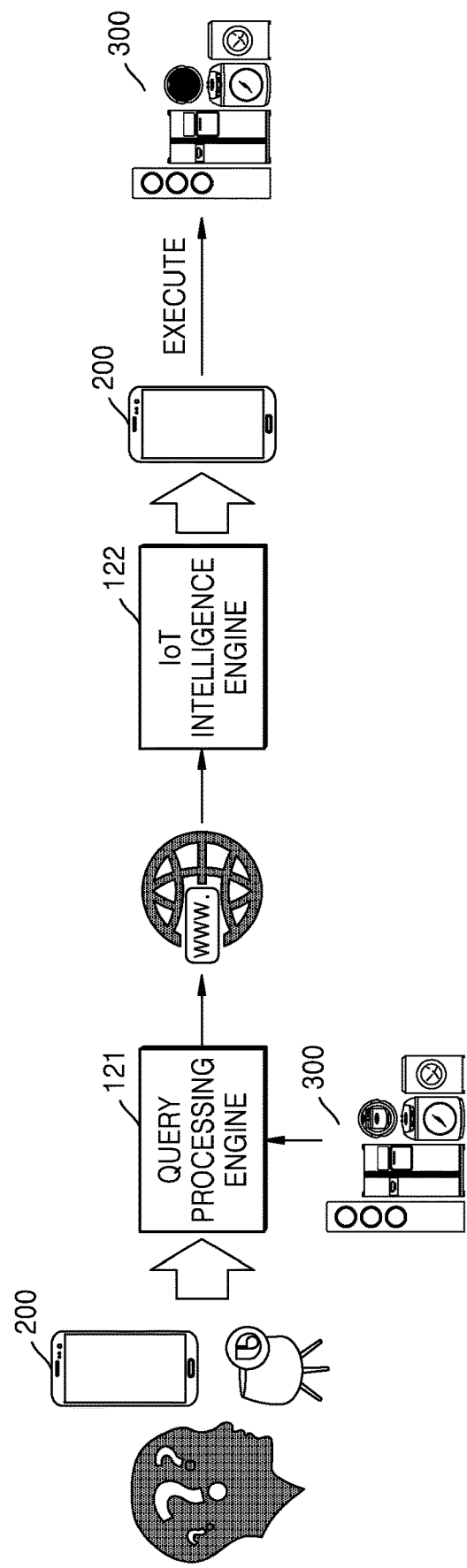
FIG. 3 illustrates a method of providing a web search and suggestion based on an Internet of things (IoT) context, according to an embodiment of the present disclosure.

FIG. 3 illustrates a method of providing a web search and suggestion based on an IoT context, according to an embodiment of the present disclosure.

The information processing device 100 may include a query processing engine 121 and an IoT intelligence engine 122.

The information processing device 100 according to the current embodiment receives user queries via an electronic device 200, processes the received user queries by using a profile and context information of an IoT device 300 of a user, and then searches for the processed user query in a web domain.

Such a query generating process may be performed by the query processing engine 121.

According to an embodiment, the electronic device 200 may be a smart phone, virtual assistant device, or artificial intelligence speaker of the user.

The IoT intelligence engine 122 changes a search result into an executable IoT instruction. The IoT instruction may be further reinforced and expanded to be generated as a final executable control or action for an IoT device.

The information processing device 100 may display, to the user through the electronic device 200, the search result and a related control over the IoT device 300.

The information processing device 100 may control the related IoT device 300 to be controlled automatically or semi-automatically, based on the search result.

According to an embodiment, the information processing device 100 may automatically execute the control over the final IoT device 300 instead of the user, according to a user setting.

According to the current embodiment, the information processing device 100 is shown as a separate device from the electronic device 200, but according to another embodiment, the information processing device 100 and the electronic device 200 may be a same device.

Figure 4:
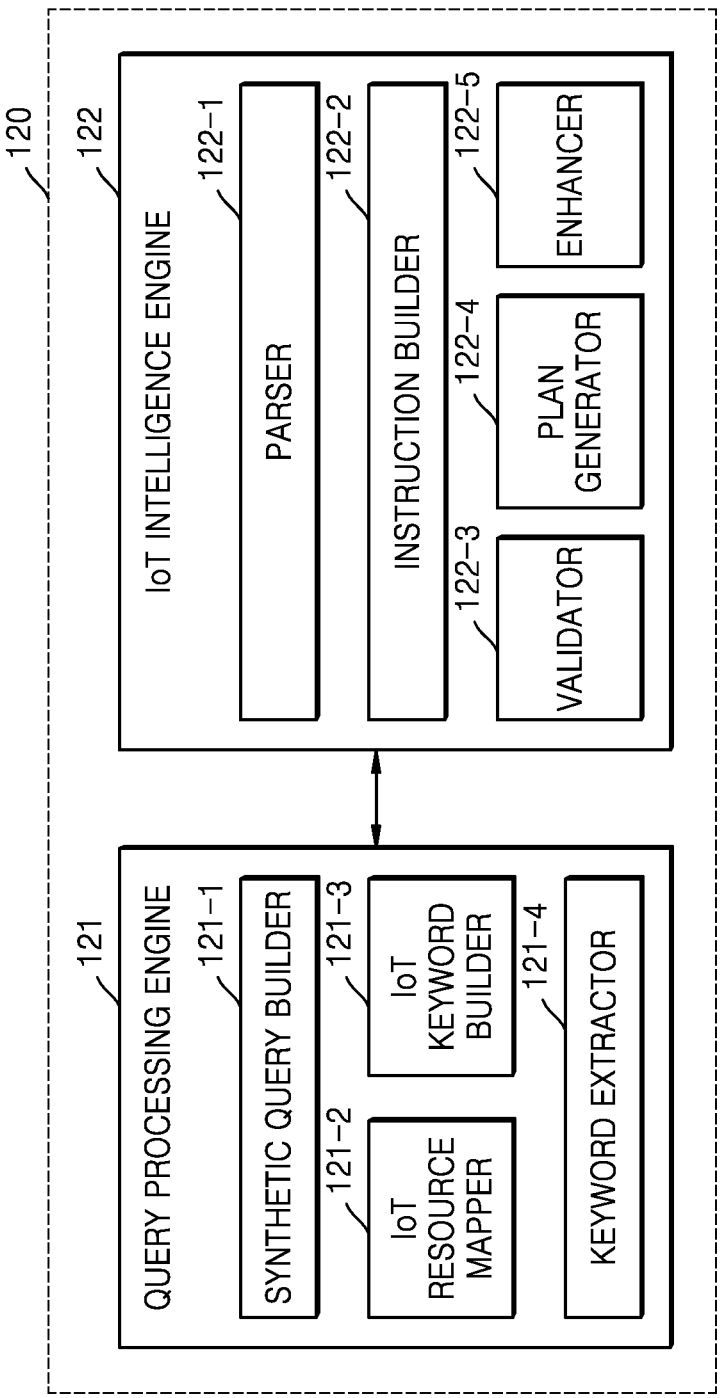
FIG. 4 is a structural diagram of a processor of an information processing device for providing a web search and suggestion, based on an IoT context, according to an embodiment of the present disclosure.

FIG. 4 is a structural diagram of a processor of an information processing device for providing a web search and suggestion, based on an IoT context, according to an embodiment of the present disclosure.

The processor 120 of the information processing device 100 may include a query processing engine 121 and an IoT intelligence engine 122.

The query processing engine 121 forms a final search query by combining related IoT keywords to a user query received from a user. The query processing engine 121 associates an IoT context to a web search capability.

The query processing engine 121 may include a keyword extractor 121-4, an IoT resource mapper 121-2, an IoT keyword builder 121-3, and a synthetic query builder 121-1.

The keyword extractor 121-4 may extract a key keyword for a web search from the user query received from the user.

The IoT resource mapper 121-2 may determine an IoT resource related to the user query. For example, the IoT resource mapper 121-2 may search for available IoT devices and determine at least one IoT device related to the user query from among found at least one IoT device.

The IoT keyword builder 121-3 may generate a search keyword related to the at least one IoT device determined by the IoT resource mapper 121-2.

The synthetic query builder 121-1 may generate a final web search query by combining a keyword extracted by the keyword extractor 121-4 and a keyword generated by the IoT keyword builder 121-3.

The IoT intelligence engine 122 may generate an IoT executable action plan from found web results.

The IoT intelligence engine 122 may include a parser 122-1, an instruction builder 122-2, a validator 122-3, a plan generator 122-4, and an enhancer 122-5.

The parser 122-1 may understand found web information by executing a natural language processing (NLP) technique. The parser 122-1 may remove grammar and formal intentions of the language by using the NLP technique. The parser 122-1 may generate a parsed instruction by separating understood web information. The parser 122-1 may extract an intention of the user by parsing a search result.

The instruction builder 122-2 may encode an IoT instruction from the parsed instruction. The instruction builder 122-2 may generate an IoT executable instruction from the web search result. The instruction builder 122-2 may map an IoT action and the intention of the user. The instruction builder 122-2 may convert the intention of the user into the IoT action by using an IoT domain dictionary.

The validator 122-3 may protect the IoT devices 300 from a wrong instruction by executing a sanity check. The validator 122-3 may validate and update a missing instruction to execute an instruction. Also, the validator 122-3 may validate a setting value or perform a sanity check on a range of a setting parameter.

According to an embodiment, the validator 122-3 may validate an operation. The validator 122-3 may perform a sanity check on operation capability and possibility. According to an embodiment, the validator 122-3 may identify a missing operation. According to an embodiment, the validator 122-3 may perform a sanity check on an instruction flow and add a missing operation. According to an embodiment, the validator 122-3 may insert the user's IoT device compatible operation.

The plan generator 122-4 may generate an instruction plan. According to an embodiment, the plan generator 122-4 may compensate for a missing operation by applying an instruction to the actual IoT device 300. According to an embodiment, the plan generator 122-4 may prepare an IoT protocol message set, i.e., an IoT device control, from the IoT instruction.

The enhancer 122-5 may add an additional operation or remove an operation, based on user information, such as a user preference, and another intelligence parameter. The enhancer 122-5 may update a control or action by referring to the user preference. The enhancer 122-5 may identify an essential operation and an optional operation from the determined control or action. The enhancer 122-5 may identify the essential operation from the instruction plan and mark the optional operation for reference during future optimization.

According to an embodiment, the enhancer 122-5 may identify a related user preference. The enhancer 122-5 may search for a user preference related to all essential and optional operations. The enhancer 122-5 may update a control or action by referring to the user preference. The enhancer 122-5 may calculate a deviation of the user preference and a current instruction, and suitably update the control or action.

According to an embodiment, the enhancer 122-5 may optimize an operation. The enhancer 122-5 may optimize an order of IoT instructions via mergence, parallelization, mutual mediation, or the like, and prepare a compact plan for executable instructions.

According to an embodiment, the enhancer 122-5 may associate the IoT instruction to the search result and enhanced IoT control. The enhancer 122-5 may find a location of a related section from the search result and insert the IoT instruction. According to an embodiment, the enhancer 122-5 may map the IoT instruction to an augmented reality according to a search result section and display media.

According to an embodiment, the enhancer 122-5 may identify a user mediation and control execution. According to an embodiment, the enhancer 122-5 may identify a manual mediation section with respect to IoT execution and control flow execution according to stopping and resuming according to a user input.

Figure 5:
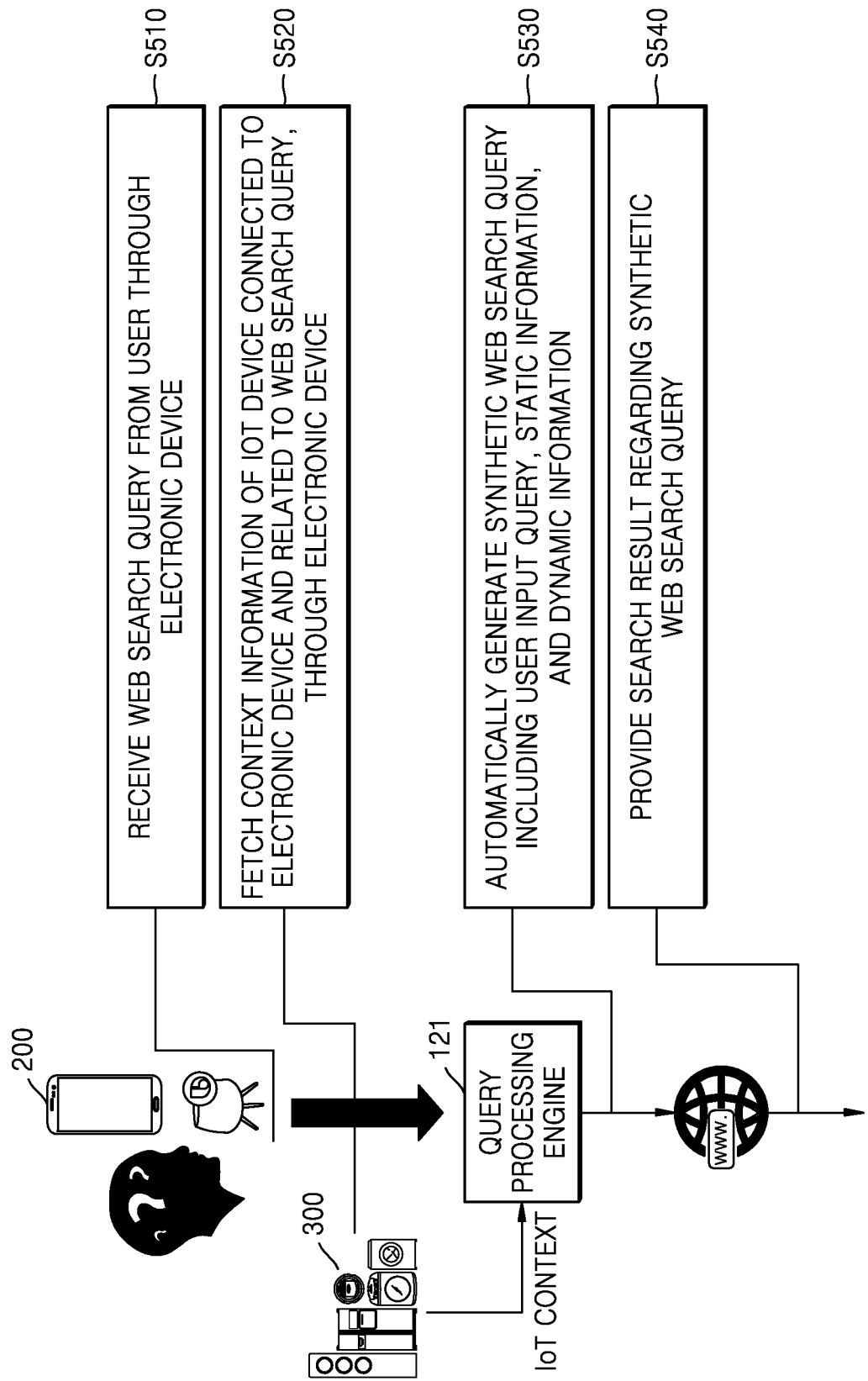
FIG. 5 is diagram showing operations included in a method of providing a web search and suggestion, based on an IoT context, according to an embodiment of the present disclosure.

FIG. 5 is diagram showing operations included in a method of providing a web search and suggestion, based on an IoT context, according to an embodiment of the present disclosure.

The method by which the information processing device 100 provides a web search and suggestion, based on an IoT context, includes receiving a web search query from a user through the electronic device 200 (operation S510).

Also, the method according to the current embodiment includes fetching context information of an IoT device related to the web search query and connected to the electronic device 200, through the electronic device 200 (operation S520).

Also, the method by which the information processing device 100 provides a web search and suggestion, based on an IoT context, according to an embodiment may include separating the context information into static information (for example, a type, basic setting, location of a device) and dynamic information (for example, state information currently read or processed by sensors).

Also, the method according to the current embodiment may include automatically generating a synthetic web search query including a user input query, the static information, and the dynamic information (operation S530).

Also, the method according to the current embodiment includes providing a search result regarding the synthetic web search query (operation S540). The web search result may be substantially related to the dynamic information.

According to an embodiment, the method by which the information processing device 100 provides a web search and suggestion, based on an IoT context, may include adding a button operable by the user, based on the search result. An action corresponding each button for an action executable in relation to the IoT device 300 may be executed in a connected IoT device in response to the user manipulating each button.

According to the current embodiment, the information processing device 100 is shown as a separate device from the electronic device 200, but according to another embodiment, the information processing device 100 and the electronic device 200 may be a same device.

Figure 6:
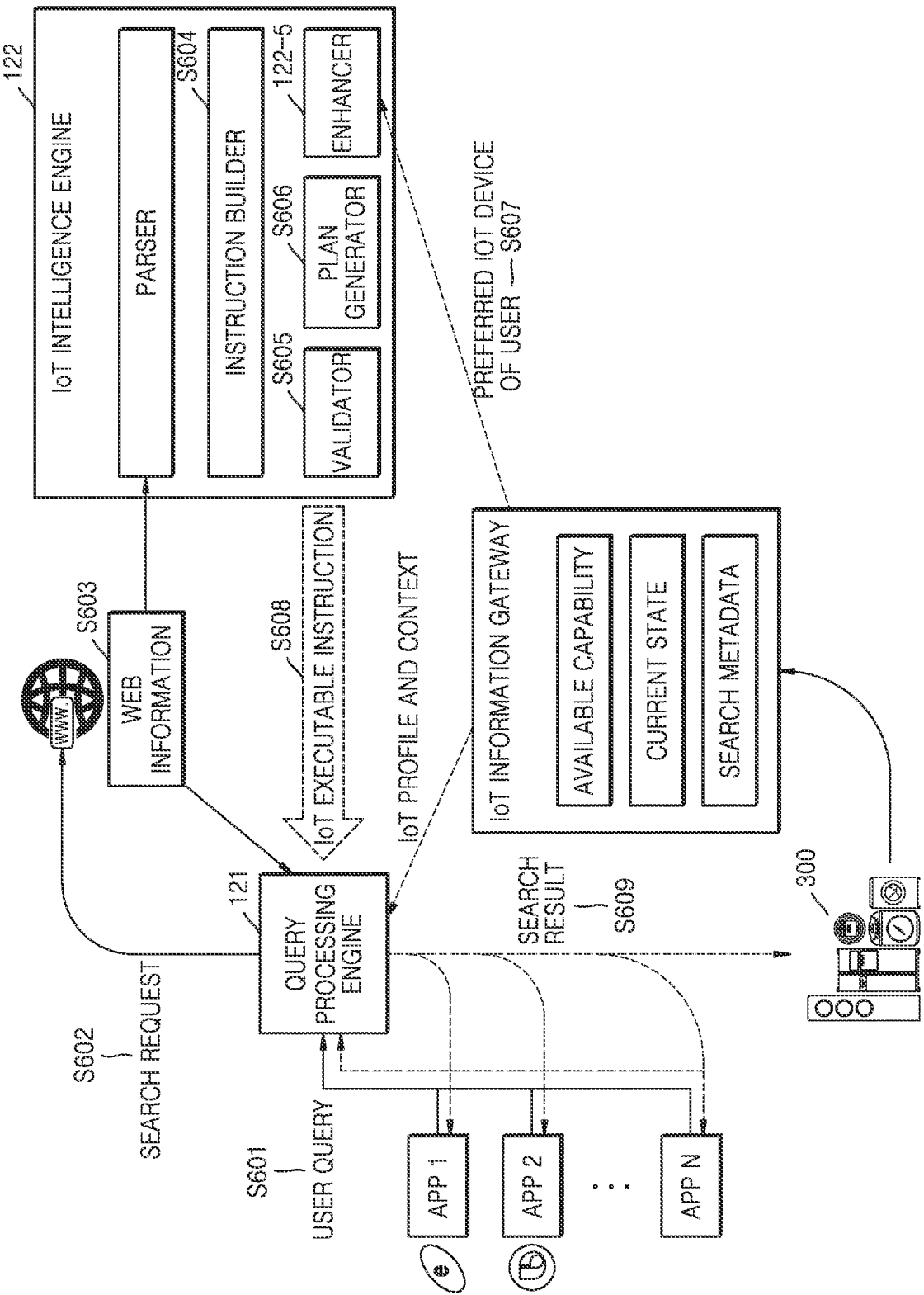
FIG. 6 is a flow diagram of providing a web search and suggestion based on an IoT context, according to an embodiment of the present disclosure.

FIG. 6 is a flow diagram of providing a web search and suggestion based on an IoT context, according to an embodiment of the present disclosure.

In operation S601, the query processing engine 121 of the information processing device 100 may receive a user query from a user. The user query may be received via various applications. In operation S601, the query processing engine 121 of the information processing device 100 may receive context information and profile of an IoT device from an IoT information gateway. The IoT information gateway may collect information on available capability, current state, and search metadata of the IoT device 300 and transmit the collected information to the query processing engine 121.

In operation S602, the query processing engine 121 may request a web search by generating a synthetic web search query according to a method described above.

In operation S603, the information processing device 100 may perform a web search using the synthetic web search query and transmit a search result to the IoT intelligence engine 122.

In operations S604, S605, S606, and S607, the IoT intelligence engine 122 may generate a control for executing an instruction in the IoT device 300, based on the received web search result.

In operation S607, the enhancer 122-5 may use preference information regarding the IoT device 300 of the user to determine the instruction and control executable in the IoT device 300.

In operation S608, the information processing device 100 may transmit, to the query processing engine 121, the instruction executable in the IoT device 300, the instruction received from the IoT intelligence engine 122.

In operation S609, the query processing engine 121 may transmit a search result to the application that received the user query. Also, the query processing engine 121 may transmit the instruction executable in the IoT device 300 to the IoT device 300.

According to an embodiment, the IoT device 300 may execute the received instruction executable in the IoT device 300.

Figure 7:
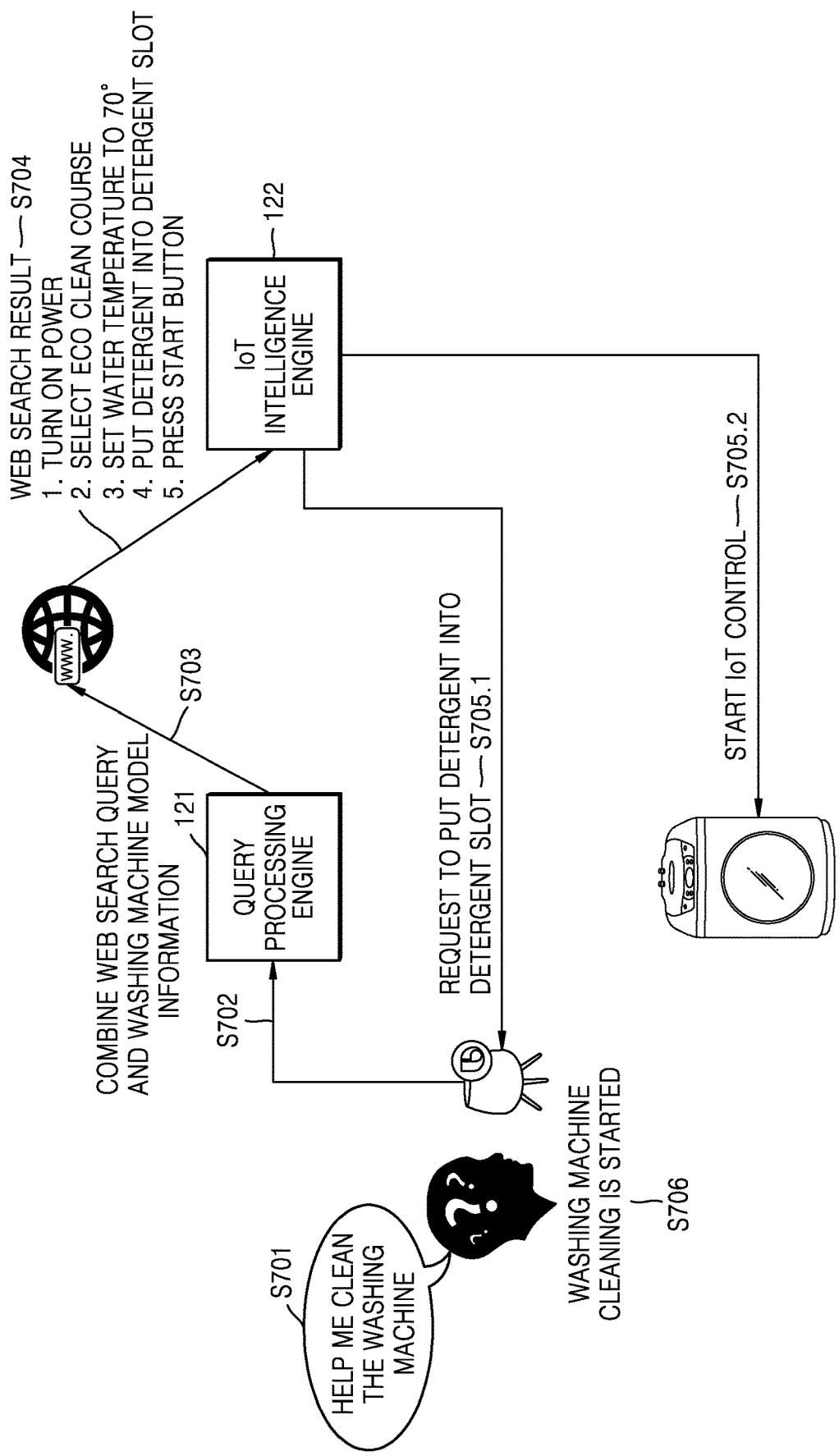
FIG. 7 illustrates an example of a message flow according to an embodiment of the present disclosure.

FIG. 7 illustrates an example of a message flow according to an embodiment of the present disclosure.

In operation S701, a user query received by the information processing device 100 may be "help me clean the washing machine".

In operation S702, the information processing device 100 may search for an IoT device, i.e., a washing machine, connected to the information processing device 100 and related to the user query, and obtain information, such as a model name or the like, about a found washing machine.

In operation S703, the query processing engine 121 may generate a synthetic web search query of "help me clean the XX model washing machine" by combining the user query of "help me clean the washing machine" and the model name of the washing machine, i.e., IoT context information.

In operation S704, the information processing device 100 may obtain a web search result and transmit the web search result to the IoT intelligence engine 122. The obtained web search result may be "1. Turn on power 2. Select eco clean course 3. Set water temperature to 70° 4. Put detergent into detergent slot 5. Press start button".

In operation S705.2, the IoT intelligence engine 122 may generate operations 1, 2, and 3 among the obtained web search result as instructions executable in the IoT device 300 and transmit the instructions to the IoT intelligence engine 122 to start an IoT device control.

In operation S705.1, the IoT intelligence engine 122 may request a user to put a detergent into detergent slot, through the information processing device 100. In other words, the IoT intelligence engine 122 may execute the instructions executable in the IoT device 300 via an interaction with the user.

After the user puts the detergent, the IoT intelligence engine 122 may automatically execute operation 5, i.e., pressing of a start button, via the IoT device control.

In operation S706, the information processing device 100 may transmit, to the user, a notification of "washing machine cleaning is started".

Figure 8:
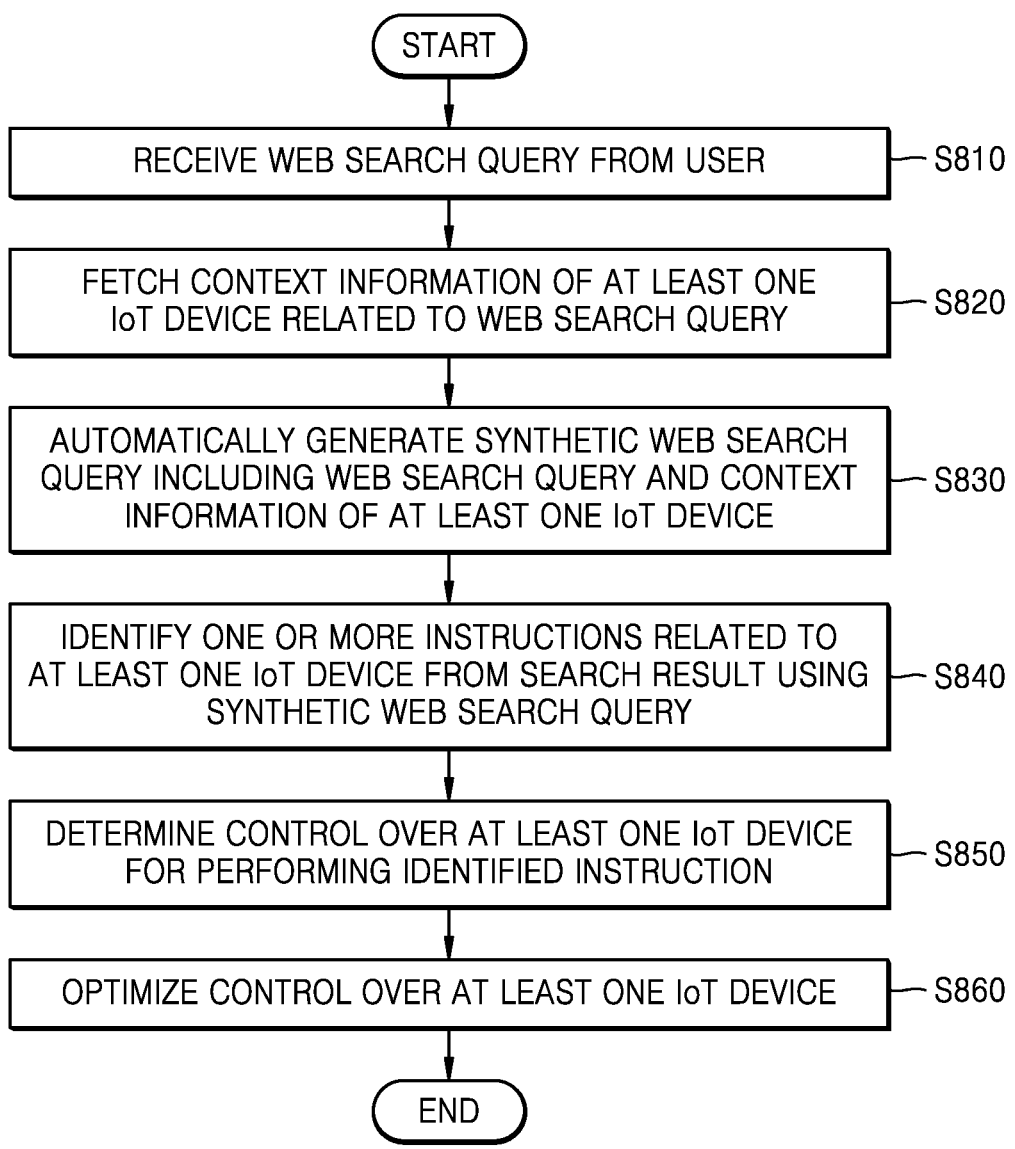
FIG. 8 is a flowchart of an information processing method according to an embodiment of the present disclosure.

FIG. 8 is a flowchart of an information processing method according to an embodiment of the present disclosure.

In operation S810, the information processing device 100 may receive a web search query from a user.

In operation S820, the information processing device 100 may fetch context information of at least one IoT device related to the web search query.

In operation S830, the information processing device 100 may automatically generate a synthetic web search query including the web search query and the context information of the at least one IoT device.

Operations S810 through S830 may be the same as operations S210 through S230 of FIG. 2.

In operation S840, the information processing device 100 may identify one or more instructions related to the at least one IoT device 300 from a web search result using the synthetic web search query. The instruction may be a final target of a user query to be performed in the IoT device 300.

In operation S850, the information processing device 100 may determine a control over the at least one IoT device 300 for performing the identified instruction. The control over the IoT device 300 may denote a detailed action plan for performing the identified instruction.

In operation S860, the information processing device 100 may optimize the determined control over the at least one IoT device 300. The information processing device 100 may optimize the determined control via pre-stored user information or a user input.

Figure 9:
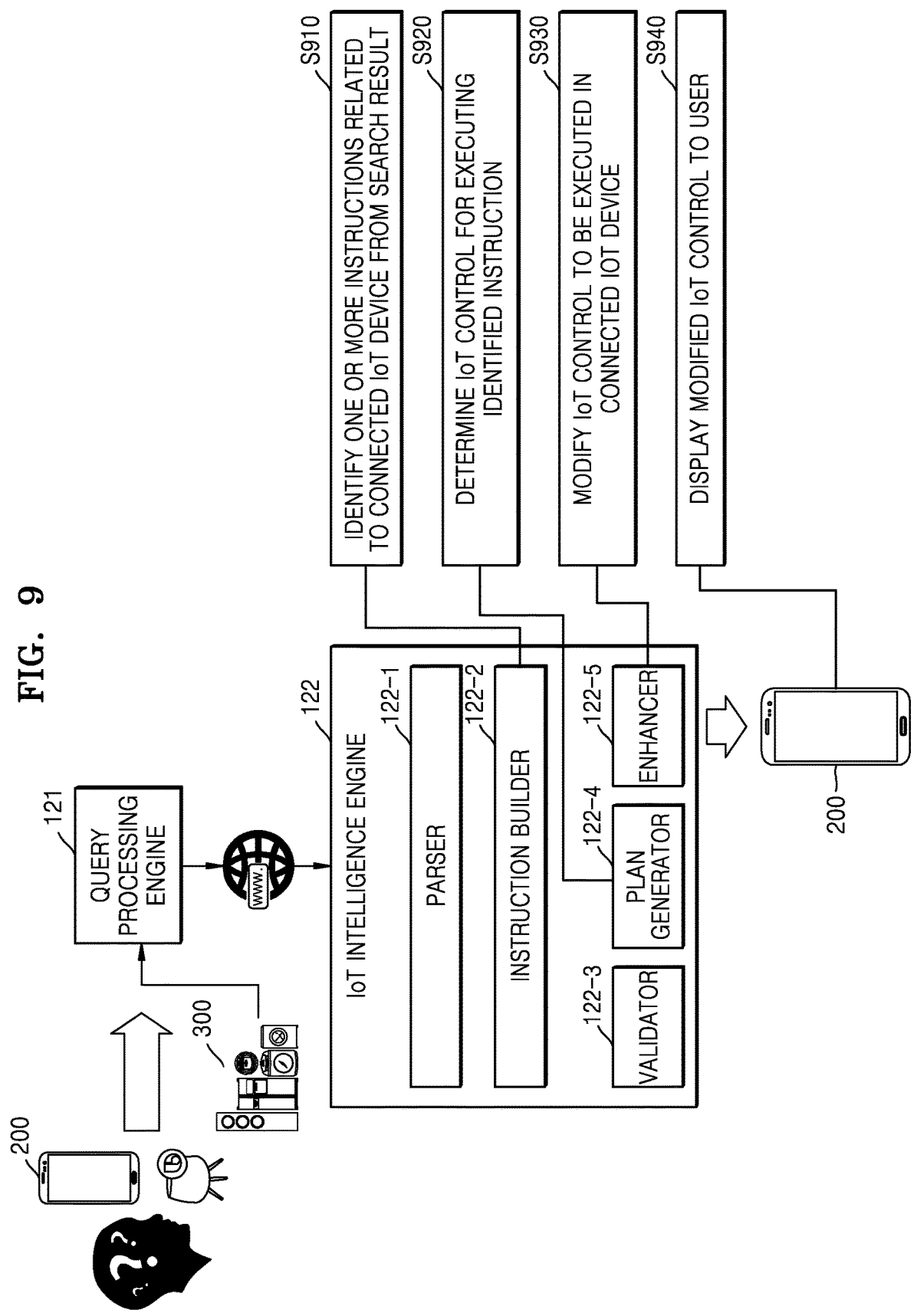
FIG. 9 is diagram showing operations included in a method of providing a web search and suggestion, based on an IoT context, according to an embodiment of the present disclosure.

FIG. 9 is diagram showing operations included in a method of providing a web search and suggestion, based on an IoT context, according to an embodiment of the present disclosure.

The method according to the current embodiment includes receiving, by the information processing device 100, a web search query from a user through the electronic device 200. Also, the method according to the current embodiment may include fetching, by the information processing device 100, context information of an IoT device connected to the electronic device 200 and related to the web search query, through the electronic device 200. Also, the method according to the current embodiment includes automatically generating a synthetic web search query including a user input query. Also, the method according to the current embodiment includes collecting a search result regarding the synthetic web search query.

The instruction builder 122-2 included in the IoT intelligence engine 122 may identify one or more instructions related to the connected IoT device 300 from the search result, in operation S910.

The plan generator 122-4 included in the IoT intelligence engine 122 may determine an IoT action or control for executing the identified instruction, in operation S920.

The enhancer 122-5 included in the IoT intelligence engine 122 may modify the IoT action or control executed by the connected IoT device, in operation S930.

The IoT intelligence engine 122 may transmit the modified IoT action or control to the electronic device 200 to display the modified IoT action or control to a user, in operation S940.

Figure 10:
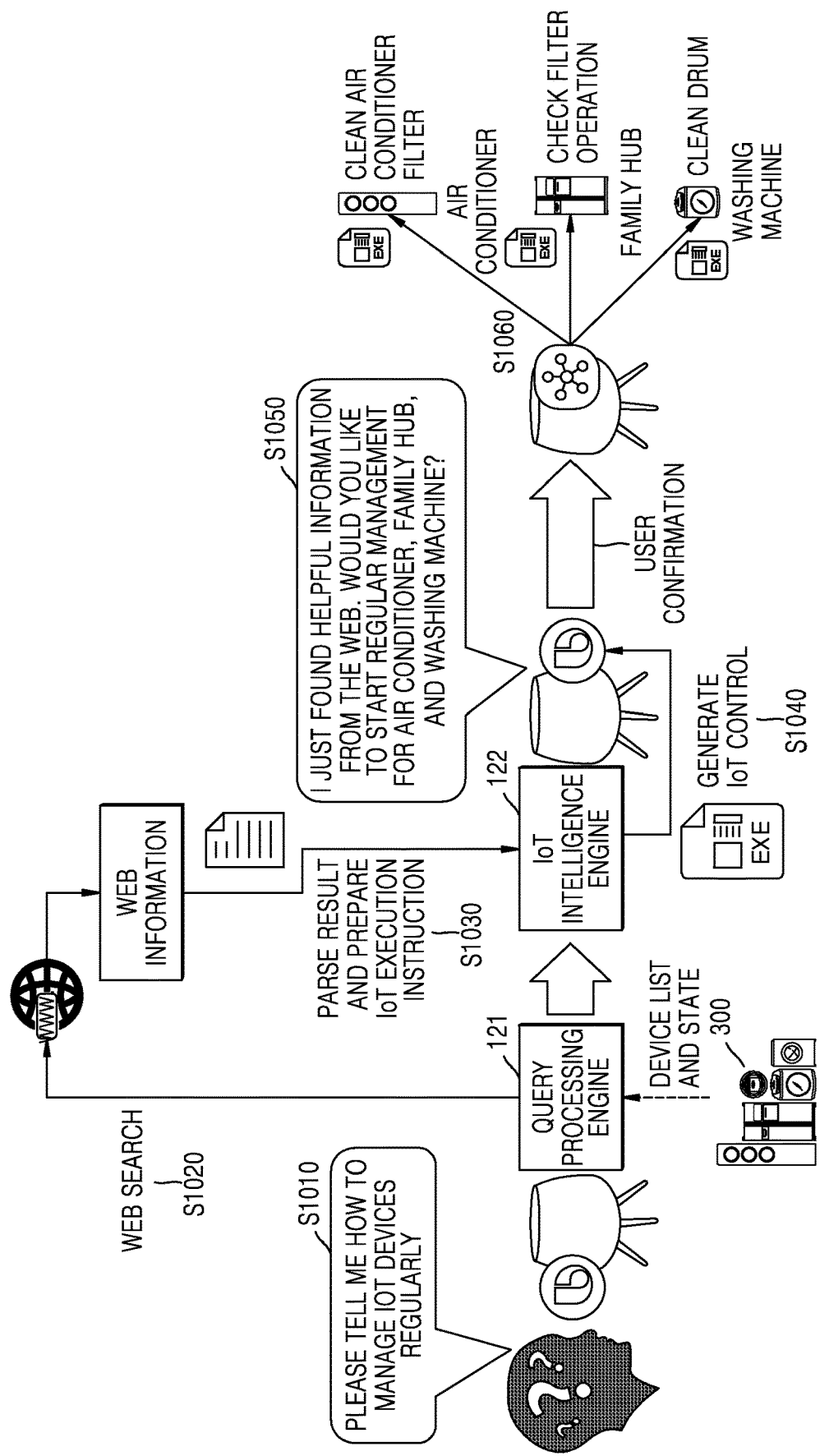
FIG. 10 illustrates a method of providing a web search and suggestion based on an IoT context, according to an embodiment of the present disclosure.

FIG. 10 illustrates a method of providing a web search and suggestion based on an IoT context, according to an embodiment of the present disclosure.

The current embodiment illustrates an example scenario of assisting a user based on an artificial intelligence (AI)

speaker. In the current embodiment, the AI speaker may correspond to the information processing device 100.

According to the current embodiment, the user may instruct any execution regarding the IoT device 300 and the information processing device 100, i.e., the AI speaker, may find a related suggestion from a web and execute the related suggestion on the IoT device 300 for the user.

In operation S1010, the information processing device 100 may receive a user query of "please tell me how to manage IoT devices regularly".

Also, in operation S1010, the information processing device 100 may determine an air conditioner, a family hub, and a washing machine as IoT devices connected to the information processing device 100 and related to the user query, and obtain context information, such as model names or the like, about the determined IoT devices.

Also, in operation S1010, the query processing engine 121 of the information processing device 100 may combine the user query of "please tell me how to manage IoT devices regularly" with an IoT device list of air conditioner, family hub, and washing machine and model names of the IoT devices, which are the context information, to generate a synthetic web search query of "please tell me how to manage A model air conditioner, B model family hub, and C model washing machine regularly".

In operation S1020, the information processing device 100 may perform a web search by using the synthetic web search query.

In operation S1030, the IoT intelligence engine 122 included in the information processing device 100 may parse a web search result and prepare an instruction executable in the IoT device 300.

In operation S1040, the IoT intelligence engine 122 included in the information processing device 100 may generate an IoT control or action to execute the instruction executable in the IoT device 300.

In operation S1050, the information processing device 100 may display a notification of "I just found helpful information from the web. Would you like to start regular management for air conditioner, family hub, and washing machine?". The notification may be in various forms, such as sound, text, and image.

In operation S1060, the information processing device 100 may receive user confirmation to start regular management for the air conditioner, the family hub, and the washing machine. In particular, the information processing device 100 may regularly clean an air conditioner filter, regularly check a filter operation of the family hub, and regularly clean a drum of the washing machine.

According to an embodiment, the information processing device 100 may display a notification to the user whenever execution of the control over IoT devices 300 is completed. According to an embodiment, the information processing device 100 may store information about a regular management state of the IoT device 300 and transmit the information to the user.

Figure 11:
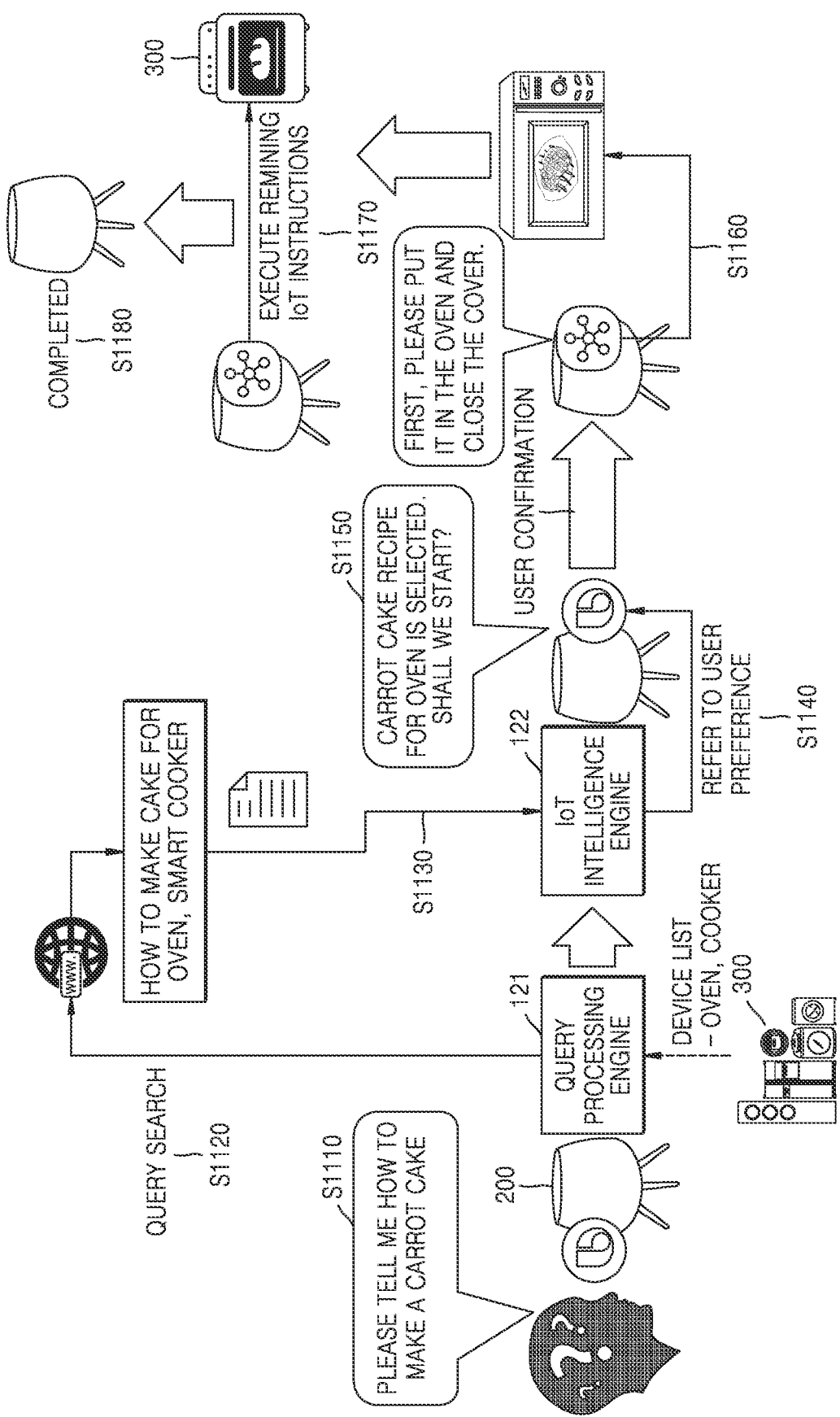
FIG. 11 illustrates a method of providing a web search and suggestion based on an IoT context, according to an embodiment of the present disclosure.

FIG. 11 illustrates a method of providing a web search and suggestion based on an IoT context, according to an embodiment of the present disclosure.

The current embodiment illustrates an example scenario of assisting a user based on manual mediation of the user.

In operation S1110, a user query received by the information processing device 100 may be "please tell me how to make a carrot cake". In operation S1110, the information processing device 100 may obtain a list of IoT devices connected to the information processing device 100 and located within a certain distance. In other words, the information processing device 100 may determine an oven and a smart cooker as IoT devices related to making a carrot cake from the obtained list of IoT devices.

In operation S1110, the query processing engine 121 may generate a synthetic web search query of "please tell me how to make a carrot cake using an oven or a smart cooker", based on the user query of "please tell me how to make a carrot cake" and IoT context information indicating that there are the oven and the smart cooker as available IoT devices.

In operation S1120, the information processing device 100 may perform a web search by using the synthetic web search query. The information processing device 100 may obtain, as web search results, a method of making a carrot cake for an oven and a method of making a carrot cake for a smart cooker.

In operation S1130, the information processing device 100 may transmit the web search results to the IoT intelligence engine 122.

In operation S1140, the information processing device 100 may refer to pre-stored information about a user preference or past cooking history information of the user, and predict that the user will select cooking using the oven because the user prefers to cook using the oven from among the oven and the smart cooker.

In operation S1150, the information processing device 100 may identify an instruction executable in the IoT device 300, based on the search result, and execute operations for executing the identified instruction. The operations for executing the identified instruction may include automatically controlling an IoT device, guiding a user action, and verifying that the guided user action is completed.

First, the information processing device 100 may display a message of "Carrot cake recipe for oven is selected. Shall we start?" to the user. The information processing device 100 may receive a confirmation to start cooking from the user. The information processing device 100 may output a guide message of "first, please put it in the oven and close the cover".

In operation S1160, the information processing device 100 may verify that a user action of putting a prepared material in the oven and closing the cover is completed.

In operation S1170, the information processing device 100 may execute remaining IoT instructions. Here, the information processing device 100 may automatically control the IoT device 300 by transmitting a generated IoT device control to the IoT device 300.

In operation S1180, the information processing device 100 may display a notification indicating that cooking is completed.

In the current embodiment, the information processing device 100 may be an AI speaker.

FIG. 12 illustrates a method of providing a web search and suggestion based on an IoT context, according to an embodiment of the present disclosure.

The current embodiment illustrates an example of a scenario of a browser-led suggestion. When a user wants to look up local weather from weather.com and a browser predicts that the user may want to turn on an air conditioner, the browser may display a control over the air conditioner in an IoT device control augmented reality.

According to the current embodiment, in addition to performing an IoT device control related to a user query, the information processing device 100 may suggest an IoT device control for satisfying a user need by predicting the user need related to the user query.

In operation S1210, the information processing device 100 may receive, through the electronic device 200, a user query of "please check the local weather from weather.com". Weather.com may be an address of a web site for searching weather.

The information processing device 100 may obtain IoT context information related to the user query from among information about the IoT device 300 connected to the electronic device 200, and generate a synthetic web search query by combining the user query and the IoT context information. Here, the IoT context information may be information about an air conditioner or a heater. The IoT context information may include a model name, setting temperature, or current state of the air conditioner or heater.

In operation S1220, the information processing device 100 may perform a web search on weather.com by using the synthetic web search query. According to an embodiment, the synthetic web search query may be "please control the heating or cooling temperature by checking the local weather from weather.com".

In operation S1230, the information processing device 100 may transmit a search result related to the user query to the IoT intelligence engine 122.

In operation S1240, the IoT intelligence engine 122 may predict a user need related to the user query and IoT context information, by referring to a user preferred temperature, air conditioner use history, and the like.

In operation S1250, the information processing device 100 may identify an executable IoT device instruction that may satisfy the predicted user need and generate an IoT device control for executing the identified instruction. The information processing device 100 may generate an augmented reality or image for controlling the air conditioner by referring to found weather information, information on the air conditioner or heater, which is an available IoT device related to weather information, the user preference temperature, and the air conditioner use history.

In operation S1260, the information processing device 100 may display the generated augmented reality or image for controlling the air conditioner, through the electronic device 200.

According to the current embodiment, the electronic device 200 is shown as a separate device from the information processing device 100, but according to another embodiment, the electronic device 200 and the information processing device 100 may be configured as one device.

Meanwhile, the embodiment may be implemented by storing a computer-readable code in a computer-readable storage medium. The computer-readable storage medium includes all types of storage devices storing data that can be read by a computer system.

The computer-readable code is configured to perform operations of implementing an information processing method according to the embodiment, when read and executed by a processor from the computer-readable storage medium. The computer-readable code may be implemented in various programming languages. In addition, functional programs, codes, and code segments for implementing the embodiment may be easily programmed by one of ordinary skill in the art to which the embodiment belongs.

Examples of the computer-readable storage medium include ROM, RAM, CD-ROM, magnetic tape, floppy disk, optical data storage device, and the like, and also include implementation in the form of a carrier wave (for example, transmission through the Internet). Further, the computer-readable storage medium may be distributed over a computer system connected through a network, and computer-readable codes may be stored and executed in a distributed manner.

The above description of the present disclosure is provided for illustration, and it will be understood by one of ordinary skill in the art that various changes in form and details may be readily made therein without departing from essential features and the scope of the present disclosure as defined by the following claims. Accordingly, the embodiments described above are examples in all aspects and are not limited. For example, each component described as a single type may be implemented in a distributed manner, and similarly, components described as distributed may be implemented in a combined form.

The scope of the present disclosure is defined by the appended claims rather than the detailed description, and all changes or modifications within the scope of the appended claims and their equivalents will be construed as being included in the scope of the present disclosure.

The invention claimed is:

1. A method, performed by an information processing device, of processing information by using an Internet of things (IoT) device, the method comprising:
   receiving, from a user, a web search query;
   fetching context information of at least one IoT device connectable with the information processing device and located within a certain distance from the information processing device related to the web search query;
   automatically generating a synthetic web search query based on the web search query and the context information of the at least one IoT device;
   changing a search result regarding the synthetic web search query into an executable IoT instruction; and
   generating a control to be applied to the at least one IoT device by reinforcing the executable IoT instruction,
   wherein the web search result and the generated control is different depending on the at least one IoT device.

2. The method of claim 1, wherein the context information of the at least one IoT device comprises at least one of a type of the at least one IoT device, a model name of the at least one IoT device, a basic setting, a location of the at least one IoT device, and state information measured by at least one sensor included in the at least one IoT device.

3. The method of claim 1, wherein automatically generating the synthetic web search query comprises:
   extracting a first keyword from the web search query;
   generating a second keyword related to the at least one IoT device from the context information of the at least one IoT device; and
   combining the first keyword and the second keyword.

4. The method of claim 1, further comprising displaying, to the user, the control to be applied to the at least one IoT device.

5. The method of claim 1, further comprising applying the search result regarding the synthetic web search query to the at least one IoT device in response to the control to be applied to the at least one IoT device being displayed in a button and a user input regarding the button being received.

6. The method of claim 1, further comprising automatically performing the generated control on the at least one IoT device.

7. The method of claim 1, further comprising:
   predicting a need of the user related to the search result; and
   determining the control to be applied to the at least one IoT device to satisfy the predicted need of the user.

8. The method of claim 1, wherein generating the control to be applied to the at least one IoT device comprises:
obtaining information about a preference of the user; and
determining the control to be applied to the at least one IoT device by using the obtained information about the preference of the user.

9. The method of claim 1, wherein the control comprises a plurality of operations and some operations among the plurality of operations automatically executed in the at least one IoT device and some operations among the plurality of operations executed in the at least one IoT device via an interaction with the user.

10. An information processing device comprising:
a memory storing one or more instructions; and
at least one processor configured to execute the one or more instructions to:
receive a web search query from a user,
fetch context information of at least one Internet of things (IoT) device connectable with the information processing device and located within a certain distance from the information processing device, related to the web search query,
automatically generate a synthetic web search query based on the web search query and the context information of the at least one IoT device,
change a search result regarding the synthetic web search query into an executable IoT instruction, and
generate a control to be applied to the at least one IoT device by reinforcing the executable IoT instruction,
wherein the web search result and the generated control is different depending on the at least one IoT device.

11. The information processing device of claim 10, wherein the context information of the at least one IoT device comprises at least one of a type of the at least one IoT device, a model name of the at least one IoT device, a basic setting, a location of the at least one IoT device, and state information measured by at least one sensor included in the at least one IoT device.

12. The information processing device of claim 10, wherein the at least one processor is further configured to execute the one or more instructions to extract a first keyword from the web search query, generate a second keyword related to the at least one IoT device from the context information of the at least one IoT device, and automatically generate the synthetic web search query by combining the first keyword and the second keyword.

13. The information processing device of claim 10, further comprising a display displaying, to the user, the control to be applied to the at least one IoT device.

14. A computer-readable recording medium having recorded thereon a program that, when executed by a computer, causes the computer to:
receive, a web search query;
fetch context information of at least one Internet of Things (IoT) device connectable with an information processing device and located within a certain distance from the information processing device related to the web search query;
automatically generate a synthetic web search query based on the web search query and the context information of the at least one IoT device;
change a search result regarding the synthetic web search query into an executable IoT instruction; and
generate a control to be applied to the at least one IoT device by reinforcing the executable IoT instruction,
wherein the web search result and the generated control is different depending on the at least one IoT device.

15. The computer-readable recording medium of claim 14, wherein the context information of the at least one IoT device comprises at least one of a type of the at least one IoT device, a model name of the at least one IoT device, a basic setting, a location of the at least one IoT device, and state information measured by at least one sensor included in the at least one IoT device.

16. The computer-readable recording medium of claim 14, wherein the program, when executed by the computer, further causes the computer to:
extract a first keyword from the web search query;
generate a second keyword related to the at least one IoT device from the context information of the at least one IoT device; and
combine the first keyword and the second keyword.

17. The computer-readable recording medium of claim 14, wherein the program, when executed by the computer, further causes the computer to display, the control to be applied to the at least one IoT device.

18. The computer-readable recording medium claim 14, wherein the program, when executed by the computer, further causes the computer to apply the search result regarding the synthetic web search query to the at least one IoT device in response to the control to be applied to the at least one IoT device being displayed in a button and a user input regarding the button being received.

* * * * *